US 11,378,559 B2

(12) United States Patent
Zhang

(10) Patent No.: US 11,378,559 B2
(45) Date of Patent: Jul. 5, 2022

(54) FLOW CELL AND LIQUID CHROMATOGRAPHIC UNIT HAVING SAME

(71) Applicant: ANHUI WAYEE SCIENCE AND TECHNOLOGY CO., LTD., Anhui (CN)

(72) Inventor: Xin Zhang, Anhui (CN)

(73) Assignee: ANHUI WAYEE SCIENCE AND TECHNOLOGY CO., LTD., Anhui (CN)

( * ) Notice: Subject to any disclaimer, the term of this patent is extended or adjusted under 35 U.S.C. 154(b) by 60 days.

(21) Appl. No.: 17/141,851

(22) Filed: Jan. 5, 2021

(65) Prior Publication Data

US 2021/0123895 A1    Apr. 29, 2021

Related U.S. Application Data

(63) Continuation of application No. PCT/CN2019/098926, filed on Aug. 1, 2019.

(30) Foreign Application Priority Data

Apr. 3, 2019    (CN) .......................... 201910265137.2

(51) Int. Cl.
*G01N 30/74*    (2006.01)
*G02B 6/032*    (2006.01)
*G01N 30/02*    (2006.01)

(52) U.S. Cl.
CPC ............. *G01N 30/74* (2013.01); *G02B 6/032* (2013.01); *G01N 2030/027* (2013.01); *G02B 2006/0325* (2013.01)

(58) Field of Classification Search
CPC .. G01N 30/74; G01N 2030/027; G01N 21/33; G01N 2021/052; G01N 2030/746; G02B 6/032; G02B 2006/0325
See application file for complete search history.

(56) References Cited

U.S. PATENT DOCUMENTS 6,603,556 B2    8/2003  Belz et al.
7,154,598 B2    12/2006  Montagu et al.
(Continued)

FOREIGN PATENT DOCUMENTS

CN    101000299    7/2007
CN    101627328    1/2010
(Continued)

OTHER PUBLICATIONS

Office Action from related Chinese Appln. No. 201910265137.2, dated Jul. 5, 2021.
(Continued)

*Primary Examiner* — Francis C Gray
(74) *Attorney, Agent, or Firm* — Grossman, Tucker, Perreault & Pfleger, PLLC

(57) ABSTRACT

A flow cell and a liquid chromatographic unit are provided. The flow cell includes a housing, a cell core, a liquid-core waveguide, an inlet connection assembly and an outlet connection assembly. The cell core is provided in the housing, and is provided with a liquid feed recess, a liquid channel and a liquid discharge recess therein. The liquid-core waveguide is provided in the liquid channel. The inlet connection assembly is provided at an end of the cell core, and includes an inlet press block, a liquid feed tube, and a light entering tube. The outlet connection assembly is arranged at another end of the cell core and is provided with a light exit hole.

20 Claims, 2 Drawing Sheets

(56) References Cited

U.S. PATENT DOCUMENTS

| | | | | |
|---|---|---|---|---|
| 7,630,076 B2* | 12/2009 | Kalonia | ............... | G01N 21/33 |
| | | | | 356/338 |
| 8,947,654 B2 | 2/2015 | Hanlon et al. | | |
| 9,091,629 B2 | 7/2015 | Hanlon et al. | | |
| 9,500,588 B2 | 11/2016 | Dicesare et al. | | |
| 2010/0315637 A1* | 12/2010 | Trainoff | ............... | G01N 21/51 |
| | | | | 356/337 |
| 2014/0063494 A1 | 3/2014 | Hatahori et al. | | |
| 2014/0247446 A1 | 9/2014 | Hanlon et al. | | |
| 2019/0107487 A1* | 4/2019 | Rahmlow | ............. | G01N 21/05 |

FOREIGN PATENT DOCUMENTS

| | | |
|---|---|---|
| CN | 103399110 | 11/2013 |
| CN | 103674844 | 3/2014 |
| CN | 103698276 | 4/2014 |
| CN | 103760107 | 4/2014 |
| CN | 204807441 | 11/2015 |
| CN | 204945029 | 1/2016 |
| CN | 106290168 | 1/2017 |
| CN | 207336334 | 5/2018 |
| CN | 207336344 | 5/2018 |
| CN | 207816802 | 9/2018 |
| CN | 109932450 | 6/2019 |
| DE | 102015008396 | 1/2017 |
| JP | 3136221 | 9/2007 |

OTHER PUBLICATIONS

Office Action from related Japanese Appln. No. 2020-571493, dated Jan. 7, 2022. English translation attached.
International Search Report from corresponding PCT Appln. No. PCT/CN2019/098926, dated Dec. 27, 2019.

* cited by examiner

FLOW CELL AND LIQUID CHROMATOGRAPHIC UNIT HAVING SAME

CROSS-REFERENCE TO RELATED APPLICATION

The present application is a continuation of International Application No. PCT/CN2019/098926, filed on Aug. 1, 2019, which claims priority to Chinese Patent Application No. 201910265137.2, filed on Apr. 3, 2019, and titled "FLOW CELL AND LIQUID CHROMATOGRAPHIC UNIT HAVING SAME", the entire contents of which are incorporated herein by reference.

TECHNICAL FIELD

The present disclosure relates to the field of sample detection and analysis devices, and more particularly, to a flow cell and a liquid chromatographic unit having same.

BACKGROUND

High performance liquid chromatography (HPLC) is commonly used in the process of sample detection and analysis, and sample separation and purification. An ultraviolet (UV) spectrophotometer is a core component of the HPLC, and a flow cell is a core component of the UV spectrophotometer.

For existing UV spectrophotometers, most of internal structures of flow paths and optical path designs in flow cells adopted by different manufactures are made of stainless steel (SS316L) parts. In the actual use of a liquid chromatographic unit, surface roughness of small holes on a stainless steel part is usually 0.8. Due to scattering of light by a liquid and a deviation of an external light path, the light inevitably irradiates inner walls of small holes in an absorption region of a flow cell, thereby leading to the more stray light and the greater loss of light energy. At the same time, a physical size of the flow cell is restricted by a size of the external light path.

SUMMARY

The present disclosure aims to solve at least one of the technical problems in the prior art. To this end, the present disclosure provides a flow cell, which has small stray light and little loss of light energy.

The present disclosure also aims to provide a liquid chromatographic unit having the flow cell.

The flow cell according to embodiments of the present disclosure includes: a housing defining an installation cavity; a cell core arranged in the installation cavity and provided with a liquid channel, a liquid feed recess, and a liquid discharge recess therein, wherein the liquid feed recess and the liquid discharge recess are formed at opposite sides of the cell core, and two ends of the liquid channel are respectively connected to the liquid feed recess and the liquid discharge recess; a liquid-core waveguide fitted in the liquid channel and configured to circulate liquid and to propagate light; an inlet connection assembly, including: an inlet press block pressed against an end of the cell core provided with the liquid feed recess; a liquid feed tube penetrating through the inlet press block and in communication with the liquid feed recess; and a light entering tube penetrating through the inlet press block and in communication with the liquid feed recess; and an outlet connection assembly pressed against an end of the cell core provided with the liquid discharge recess, wherein the outlet connection assembly is provided with a light exit hole facing towards the liquid discharge recess, in such a manner that light passes through the light entering tube, the liquid feed recess, the liquid-core waveguide, the liquid discharge recess, and the light exit hole sequentially to exit the installation cavity.

With the flow cell according to embodiments of the present disclosure, light enters the liquid-core waveguide directly after entering the liquid feed recess from the light entering tube, so that a total reflection occurs on an inner wall of the liquid-core waveguide, which can reduce energy loss and the probability of occurrence of the stray light. In view of this, the affection of the energy loss of the light or the occurrence of the stray light can be reduced for the output intensity of the light, thereby improving the accuracy of concentration detection of the liquid. In addition, the structure of the inlet press block and the outlet press block may better seal the cell core and withstand a greater liquid pressure.

In some embodiments, the outlet connection assembly includes a window pressed against the end of the cell core provided with the liquid discharge recess. A light-shielding film is provided at a side of the window facing towards the liquid discharge recess. The light exit hole is provided on the light-shielding film. A light through hole corresponding to the light exit hole is provided on the housing.

In some embodiments, the outlet connection assembly further includes a gasket surrounding the light through hole and sandwiched between the housing and the window.

In some embodiments, the inlet connection assembly further includes a return pipe penetrating through the cell core, and the return pipe has an end connected to the liquid discharge recess.

In some embodiments, the inlet connection assembly further includes a pre-tensioning part arranged in the installation cavity and located at a side of the inlet press block facing away from a liquid feed port. An elastic member is provided between the pre-tensioning part and the inlet press block to achieve sealing abutment among the cell core, the inlet press block and the outlet connection assembly.

In some embodiments, the outlet connection assembly further includes: an outlet press block pressed against the end of the cell core provided with the liquid discharge recess; a liquid discharge tube penetrating through the outlet press block and in communication with the liquid discharge recess; and a light exiting tube penetrating through the outlet press block and in communication with the liquid discharge recess, wherein the light exit hole is formed on the light exiting tube.

In some embodiments, the flow cell further includes a protective sleeve. The liquid-core waveguide is sleeved with the protective sleeve.

In some embodiments, the window is quartz glass. A diameter of the light exit hole is smaller than or equal to 0.5 mm.

In some embodiments, the light-shielding film is a metal film or a screen printing coating film.

The liquid chromatographic unit according to embodiments of the present disclosure includes the flow cell as described above.

Since the liquid chromatographic unit according to embodiments of the present disclosure includes the flow cell as described above, the accuracy of detection is high, and a relatively high liquid pressure may be withstood.

Additional aspects and advantages of the present disclosure will be given in part in the following descriptions, become apparent in part from the following descriptions, or be learned from the practice of the present disclosure.

BRIEF DESCRIPTION OF DRAWINGS

These and other aspects and advantages of the present disclosure will become apparent and more readily appreciated from the following descriptions made with reference to the accompanying drawings.

Figures 1, 2, 3:
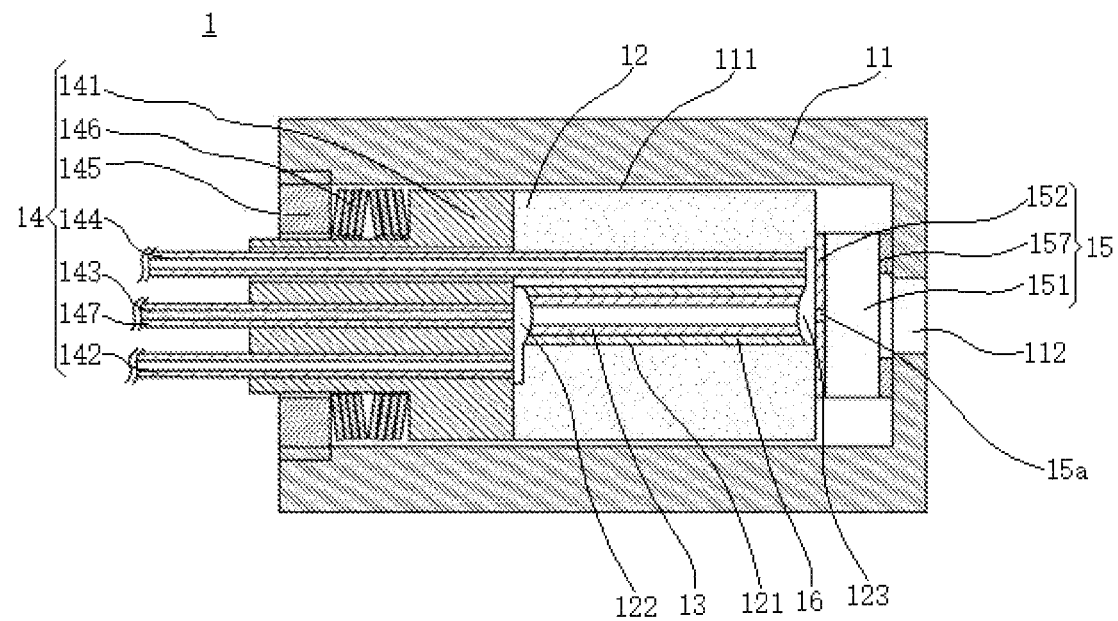
FIG. 1 is a schematic diagram of a flow cell according to embodiments of the present disclosure.
FIG. 2 is a vertical cross-sectional view of a cell core of the flow cell illustrated in FIG. 1 at a liquid discharge recess.
FIG. 3 is a vertical cross-sectional view of a cell core of the flow cell illustrated in FIG. 1 at a liquid feed recess.

REFERENCE NUMERALS OF THE ACCOMPANYING DRAWING flow cell 1
  housing 11
    installation cavity 111, a light through hole 112
  cell core 12
    liquid channel 121, liquid feed recess 122, liquid discharge recess 123
  liquid-core waveguide 13
  inlet connection assembly 14
    inlet press block 141, liquid feed tube 142, light entering tube 143,
    return pipe 144, pre-tensioning part 145, elastic member 146,
    light entering sleeve 147
  outlet connection assembly 15, light exit hole 15a
    window 151, light-shielding film 152, gasket 157, inlet press block 153,
    liquid discharge tube 154, light exiting tube 155, light exiting sleeve 156
  protective sleeve 16

DESCRIPTION OF EMBODIMENTS

Descriptions will now be made in detail to embodiments, examples of which are illustrated in the accompanying drawings. The same or similar elements and the elements having same or similar functions are denoted by like reference numerals throughout the descriptions. The embodiments described herein with reference to the drawings are explanatory and merely used to explain the present disclosure, and shall not be construed to limit the present disclosure.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "anti-clockwise", "axial", "radial" and "circumference" refer to orientations and location relations which are those shown in the drawings, merely for sake of describing the present disclosure and simplification, rather than indicating or implying that the device or the elements are disposed to locate at the specific orientations or are structured and performed in the specific orientations, and thus cannot be construed as the limitation of the present disclosure. In addition, the feature denoted by "first" and "second" may include one or more such feature distinctly or implicitly. In the description of the present disclosure, "a plurality of" means two or more, unless specified otherwise.

It should be noted that in the present disclosure, unless specified or limited otherwise, the terms "mounted," "connected," and "coupled" shall be understood broadly, such as fixed connection, detachable connection, or connection into one piece; mechanical or electrical connection; and direct connection, connection via an intermediate medium, or connection between two elements. Meanings of the terms in the present disclosure can be understood by those skilled in the art according to detail embodiments of the present disclosure.

The specific structure of a flow cell 1 according to embodiments of the present disclosure will be described below with reference to FIGS. 1 to 5.

As illustrated in FIG. 1, the flow cell 1 according to embodiments of the present disclosure includes a housing 11, a cell core 12, a liquid-core waveguide 13, an inlet connection assembly 14, and an outlet connection assembly 15.

Figure 4:
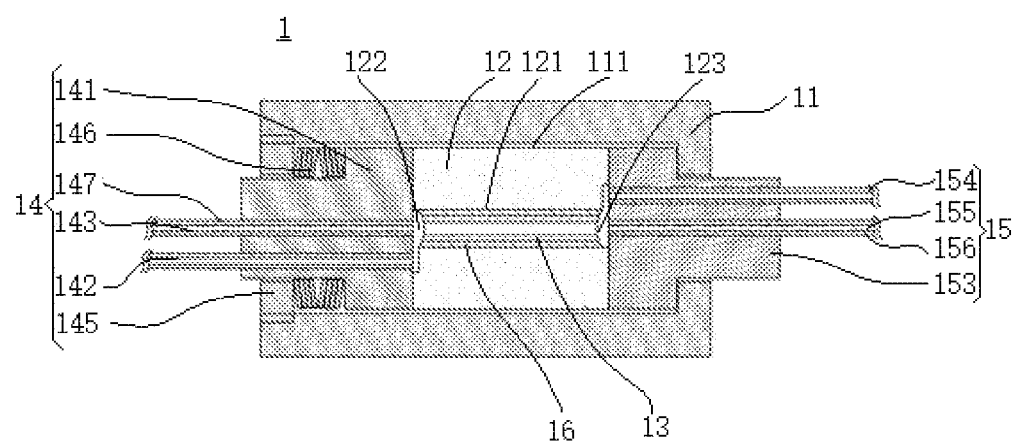
FIG. 4 is a schematic diagram of a flow cell according to embodiments of the present disclosure.

As illustrated in FIGS. 1 and 4, the housing 11 defines an installation cavity 111. The cell core 12 is arranged in the installation cavity 111, and is provided with a liquid channel 121, a liquid feed recess 122, and a liquid discharge recess 123 therein. The liquid feed recess 122 and the liquid discharge recess 123 are formed at opposite sides of the cell core 12. Two ends of the liquid channel 121 are respectively connected to the liquid feed recess 122 and the liquid discharge recess 123. The liquid-core waveguide 13 is fitted in the liquid channel 121, and is configured to circulate liquid and to propagate light. The inlet connection assembly 14 includes an inlet press block 141, a liquid feed tube 142, and a light entering tube 143. The inlet press block 141 is pressed against an end of the cell core 12 provided with the liquid feed recess 122. The liquid feed tube 142 is pierced on the inlet press block 141, and is in communication with the liquid feed recess 122. The light entering tube 143 penetrates through the inlet press block 141, and is in communication with the liquid feed recess 122. The outlet connection assembly 15 is pressed against an end of the cell core 12 provided with the liquid discharge recess 123. The outlet connection assembly 15 is provided with a light exit hole 15a facing towards the liquid discharge recess 123, so that light passes through the light entering tube 143, the liquid feed recess 122, the liquid-core waveguide 13, the liquid discharge recess 123, and the light exit hole 15a sequentially to exit the installation cavity 111.

It may be understood that when a liquid flows through the liquid-core waveguide 13, the liquid is irradiated by the light, so that the liquid will absorb a part of the light. According to an incident intensity and an output intensity of the light, a concentration of the liquid may be calculated by the Lambert-Beer law. Since stray light and energy loss may occur during the propagation of light, deviations may occur in the output intensity of the light, leading to deviations in the calculation of the concentration of the liquid.

According to the embodiments of the present disclosure, the light enters the liquid-core waveguide 13 directly after entering the liquid feed recess 122 from the light entering tube 143, so that a total reflection occurs on an inner wall of the liquid-core waveguide 13, which can reduce energy loss and the probability of occurrence of the stray light. In view of this, the affection of the energy loss of the light or the occurrence of the stray light can be reduced for the output intensity of the light, thereby improving the accuracy of concentration detection of the liquid. In addition, according to the present disclosure, the inlet press block 141 is pressed against the end of the cell core 12 provided with the liquid feed recess 122, and the outlet connection assembly 15 is pressed against the end of the cell core 12 provided with the liquid discharge recess 123, so that the sealing performance of the flow cell 1 can be better guaranteed, and a greater liquid pressure may be withstood.

With the flow cell 1 according to embodiments of the present disclosure, the light enters the liquid-core waveguide 13 directly after entering the liquid feed recess 122 from the light entering tube 143, so that a total reflection occurs on an inner wall of the liquid-core waveguide 13, which can reduce energy loss and the probability of occurrence of the stray light. In view of this, the affection of the energy loss of the light or the occurrence of the stray light can be reduced for the output intensity of the light, thereby improving the accuracy of concentration detection of the liquid. In addition, the structures of the inlet press block 141 and the outlet connection assembly 15 may better seal the cell core 12 while withstanding a greater liquid pressure.

In some embodiments, the liquid-core waveguide 13 uses a TEFLON tube with a lower refractive index than that of the liquid, such as TEFLON 2400.

In some embodiments, as illustrated in FIG. 1, the light entering tube 143 is an optical fiber, and a light entering sleeve 147 is provided around the optical fiber for protecting the optical fiber. This can ensure stable propagation of the light in the light entering tube 143 while protecting the optical fiber, thereby prolonging the service life of the flow cell 1.

In some embodiments, as illustrated in FIG. 1, a part of a cross section of the liquid feed recess 122 facing towards the light entering tube 143 is in a bow shape, and a part of a cross section of the liquid feed recess 122 facing towards the liquid feed tube 142 is in a long strip shape. This not only ensures that the light may be well incident into the liquid-core waveguide 13, but also ensures that the liquid flows into the liquid-core waveguide 13, thereby reducing the energy loss of incident light while avoiding the occurrence of liquid accumulation in the liquid feed recess 122.

In some embodiments, as illustrated in FIG. 1, the outlet connection assembly 151 includes a window 151. The window 151 is pressed against the end of the cell core 12 provided with the liquid discharge recess 123. A light-shielding film 152 is provided at a side of the window 151 facing towards the liquid discharge recess 123. The light exit hole 15a is provided on the light-shielding film 152. A light through hole 112 corresponding to the light exit hole 15a is provided on the housing 11. It may be understood that in the related art, generally, small holes are provided on a sealing gasket to achieve the function of a slit or a light diaphragm. In the present disclosure, the light exit hole 15a is provided on the light-shielding film 152 at the side of the window 151 facing towards the liquid discharge recess 123, such that the possibility of the occurrence of the stray light is reduced, and a greater liquid pressure may be withstood. In addition, the window 151 is easier to manufacture.

In some embodiments, the window 151 is quartz glass. A diameter of the light exit hole 15a is smaller than or equal to 0.5 mm By adopting the quartz glass, the window 151 may withstand a greater liquid pressure. At the same time, if the light exit hole 15a is too large, external light will enter the liquid discharge recess 123, thereby affecting the detection result. Therefore, setting the diameter of the light exit hole 15a to be smaller than or equal to 0.5 mm may better prevent the external light from entering, thereby ensuring the accuracy of detection. Of course, it should be noted that the size of the light exit hole 15a may be selected based on practical requirements, and is not limited to the above range.

In some embodiments, the light-shielding film 152 is a metal film or a screen printing coating film, so that the light-shielding film 152 can be in close contact with the window 151, thereby avoiding a gap between the light-shielding film 152 and the window 151, which would otherwise cause the stray light. Of course, the light-shielding film 152 may also be made of other light-shielding materials, which will not be illustrated here.

In some specific embodiments, the outlet connection assembly 15 further includes a gasket 157. The gasket 157 surrounds the light through hole 112 and is sandwiched between the housing 11 and the window 151. It may be understood that the gasket 157 sandwiched between the housing 11 and the window 151 may improve the sealing performance of the flow cell 1 while protecting the window 151 to a certain extent. It should be noted that the gasket 157 is mainly used to enhance the sealing performance and to protect the window 151. The specific type and material of the gasket 157 are not limited here, and may be determined based on practical requirements.

In some embodiments, as illustrated in FIG. 1, the inlet connection assembly 14 further includes a return pipe 144. The return pipe 144 penetrates through the cell core 12. The return pipe 144 has an end connected to the liquid discharge recess 123. It should be understood that the liquid may flow into the return pipe 144 after passing through the liquid discharge recess 123, and then flow out of the return pipe 144, so that an inlet and an outlet of the liquid are located on the same side of the cell core 12, thereby reducing a volume of the flow cell 1 and facilitating liquid circulation.

In some embodiments, as illustrated in FIG. 1, a part of a cross section of the liquid discharge recess 123 facing towards the liquid-core waveguide 13 is in a bow shape, and a part of a cross section of the liquid discharge recess 123 facing towards the return pipe 144 is in a long strip shape. This not only ensures that the light may be better transmitted from the liquid-core waveguide 13 to the light exit hole 15a, but also ensures that the liquid flows into the return pipe 144, which not only reduces the energy loss of the exit light, but also avoids the liquid accumulation in the liquid discharge recess 123. Of course, in other embodiments of the present disclosure, the inlet connection assembly 14 may not include the return pipe 144, and instead, a pipe connected to the liquid discharge recess 123 and located at the other end of the cell core 12 is provided as a liquid discharge tube 154.

In some embodiments, as illustrated in FIGS. 1 and 4, the inlet connection assembly 14 further includes a pre-tensioning part 145. The pre-tensioning part 145 is arranged in the installation cavity 111 and located at a side of the inlet press block 141 facing away from a liquid feed port. An elastic member 146 is provided between the pre-tensioning part 145 and the inlet press block 141, so as to form sealing abutment among the cell core 12, the inlet press block 141 and the outlet connection assembly 15. It may be understood that the presence of the pre-tensioning part 145 and the elastic member 146 may form the sealing abutment among the cell core 12, the inlet press block 141 and the outlet connection assembly 15, thereby avoiding liquid leakage. It should be noted that the pre-tensioning part 145 and a side wall of the installation cavity 111 may be connected by a thread, which not only facilitates the installation of the pre-tensioning part 145, but also ensures the sealing abutment of the pre-tensioning part 145 and the elastic member 146 against the cell core 12, the inlet press block 141 and the outlet connection assembly 15. In addition, the type of the elastic member 146 is not limited here. The elastic member 146 may be a spring, a disc elastic sheet, or an elastic cushion. The specific type and material of the elastic member 146 may be determined based on practical requirements.

In some embodiments, as illustrated in FIG. 4, the outlet connection assembly 15 further includes an outlet press block 153, the liquid discharge tube 154, and a light exiting tube 155. The outlet press block 153 is pressed against the end of the cell core 12 provided with the liquid discharge recess 123. The liquid discharge tube 154 penetrates through the outlet press block 153, and is in communication with the liquid discharge recess 123. The light exiting tube 155 penetrates through the outlet press block 153, and is in communication with the liquid discharge recess 123. The light exit hole 15a is formed on the light exiting tube 155. It may be understood that the presence of the outlet press block 153 and the inlet press block 141 may better ensure the sealing performance of the flow cell 1, thereby avoiding liquid leakage. In addition, with the light exiting tube 155 provided to be connected to the liquid discharge recess 123, the light may directly enter the light exiting tube 155 after passing through the liquid discharge recess 123, such that the energy loss is reduced, and the possibility of stray light generation is lowered. In view of this, the affection of the energy loss of the light or the occurrence of the stray light can be reduced for the output intensity of the light, thereby improving the accuracy of concentration detection of the liquid.

In some embodiments, the light exiting tube 155 is an optical fiber, and the optical fiber is sleeved with a light exiting sleeve 156 for protecting the optical fiber. This can ensure the stable propagation of light in the light exiting tube 155 while protecting the optical fiber, thereby prolonging the service life of the flow cell 1.

In some embodiments, as illustrated in FIGS. 1 and 4, the flow cell 1 further includes a protective sleeve 16. The liquid-core waveguide 13 is sleeved with the protective sleeve 16. It may be understood that the protective sleeve 16 may protect the liquid-core waveguide 13. Of course, the protective sleeve 16 mainly plays a role of protecting the liquid-core waveguide 13. The specific type of the protective sleeve 16 is not limited herein.

Embodiment 1

The flow cell 1 according to a specific embodiment of the present disclosure will be described below with reference to FIGS. 1 to 3.

The flow cell 1 according to the embodiment includes the housing 11, the cell core 12, the liquid-core waveguide 13, the inlet connection assembly 14, and the outlet connection assembly 15. The housing 11 defines the installation cavity 111. The cell core 12 is arranged in the installation cavity 111, and is provided with the liquid channel 121, the liquid feed recess 122, and the liquid discharge recess 123 therein. The liquid feed recess 122 and the liquid discharge recess 123 are formed at opposite sides of the cell core 12. Two ends of the liquid channel 121 are respectively connected to the liquid feed recess 122 and the liquid discharge recess 123. The liquid-core waveguide 13 is fitted in the liquid channel 121, and is configured to circulate liquid and to propagate light. The liquid-core waveguide 13 is sleeved with the protective sleeve 16. The inlet connection assembly 14 includes the inlet press block 141, the liquid feed tube 142, the light entering tube 143, the return pipe 144, the pre-tensioning part 145, and the elastic member 146. The inlet press block 141 is pressed against the end of the cell core 12 provided with the liquid feed recess 122. The liquid feed tube 142 penetrates through the inlet press block 141, and is in communication with the liquid feed recess 122. The light entering tube 143 penetrates through the inlet press block 141, and is in communication with the liquid feed recess 122. The outlet connection assembly 15 is pressed against the end of the cell core 12 provided with the liquid discharge recess 123. The return pipe 144 penetrates through the cell core 12. The return pipe 144 has an end connected to the liquid discharge recess 123. The light entering tube 143 is the optical fiber. The light entering tube 143 is sleeved with the light entering sleeve 147. The pre-tensioning part 145 is arranged in the installation cavity 111 and located at a side of the inlet press block 141 facing away from the liquid feed port. The elastic member 146 is provided between the pre-tensioning part 145 and the inlet press block 141, so as to form sealing abutment among the cell core 12, the inlet press block 141 and the outlet connection assembly 15. The outlet connection assembly 15 includes the window 151 and the gasket 157. The window 151 is pressed against an end of the cell core 12 provided with the liquid discharge recess 123. The light-shielding film 152 is provided at a side of the window 151 facing towards the liquid discharge recess 123. The light exit hole 15a is provided on the light-shielding film 152. The light through hole 112 corresponding to the light exit hole 15a is provided on the housing 11.

Figure 5:
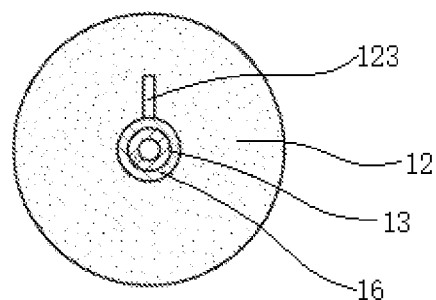
FIG. 5 is a vertical cross-sectional view of a cell core of the flow cell illustrated in FIG. 4 at a liquid discharge recess.

A flow cell 1 according to another specific embodiment of the present disclosure will be described below with reference to FIGS. 4 to 5.

The flow cell 1 according to the embodiment includes a housing 11, a cell core 12, a liquid-core waveguide 13, an inlet connection assembly 14 and an outlet connection assembly 15. The housing 11 defines an installation cavity 111. The cell core 12 is arranged in the installation cavity 111, and is provided with a liquid channel 121, a liquid feed recess 122, and a liquid discharge recess 123 therein. The liquid feed recess 122 and the liquid discharge recess 123 are formed at opposite sides of the cell core 12. Two ends of the liquid channel 121 are respectively connected to the liquid feed recess 122 and the liquid discharge recess 123. The liquid-core waveguide 13 is fitted in the liquid channel 121, and is configured to circulate liquid and to propagate light. The liquid-core waveguide 13 is sleeved with a protective sleeve 16. The inlet connection assembly 14 includes an inlet press block 141, a liquid feed tube 142, a light entering tube 143, a return pipe 144, a pre-tensioning part 145, and an elastic member 146. The inlet press block 141 is pressed against an end of the cell core 12 provided with the liquid feed recess 122. The liquid feed tube 142 penetrates through the inlet press block 141, and is in communication with the liquid feed recess 122. The light entering tube 143 penetrates through the inlet press block 141, and is in communication with the liquid feed recess 122. The outlet connection assembly 15 is pressed against an end of the cell core 12 provided with the liquid discharge recess 123. The return pipe 144 penetrates through the cell core 12. The return pipe 144 has an end connected to the liquid discharge recess 123. The light entering tube 143 is an optical fiber. The light entering tube 143 is sleeved with the light entering sleeve 147. The pre-tensioning part 145 is arranged in the installation cavity 111 and located at a side of the inlet press block 141 facing away from the liquid feed port. The elastic member 146 is provided between the pre-tensioning part 145 and the inlet press block 141, so as to achieve sealing abutment among the cell core 12, the inlet press block 141 and the outlet connection assembly 15.

The outlet connection assembly 15 further includes an outlet press block 153, a liquid discharge tube 154, and a light exiting tube 155. The outlet press block 153 is pressed against the end of the cell core 12 provided with the liquid discharge recess 123. The liquid discharge tube 154 penetrates through the outlet press block 153, and is in communication with the liquid discharge recess 123. The light exiting tube 155 penetrates through the outlet press block 153, and is in communication with the liquid discharge recess 123. The light exit hole 15a is formed on the light exiting tube 155. The light exiting tube 155 is an optical fiber. The light entering tube 143 is sleeved with the light exiting sleeve 156.

The liquid chromatographic unit according to embodiments of the present disclosure includes the flow cell 1 described above.

Since the liquid chromatographic unit according to embodiments of the present disclosure includes the flow cell 1 as described above, the accuracy of detection is high, and a relatively high liquid pressure may be withstood.

Reference throughout this specification to "an embodiment" and "an example" means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of present disclosure have been shown and described above, it should be understood by those skilled in the art that changes, alternatives, and modifications may be made to the embodiments without departing from spirit and principles of the present disclosure. The scope of the present disclosure is limited by the attached claims and its equivalents.

What is claimed is:

1. A flow cell, comprising:
   a housing defining an installation cavity;
   a cell core arranged in the installation cavity and provided with a liquid channel, a liquid feed recess, and a liquid discharge recess therein, wherein the liquid feed recess and the liquid discharge recess are formed at opposite sides of the cell core, and two ends of the liquid channel are respectively connected to the liquid feed recess and the liquid discharge recess;
   a liquid-core waveguide fitted in the liquid channel and configured to circulate liquid and to propagate light;
   an inlet connection assembly, comprising:
      an inlet press block pressed against an end of the cell core provided with the liquid feed recess;
      a liquid feed tube penetrating through the inlet press block and in communication with the liquid feed recess; and
      a light entering tube penetrating through the inlet press block and in communication with the liquid feed recess; and
   an outlet connection assembly pressed against an end of the cell core provided with the liquid discharge recess, wherein the outlet connection assembly is provided with a light exit hole facing towards the liquid discharge recess, in such a manner that light passes through the light entering tube, the liquid feed recess, the liquid-core waveguide, the liquid discharge recess, and the light exit hole sequentially to exit the installation cavity,
   wherein the inlet connection assembly further comprises:
      a pre-tensioning part arranged in the installation cavity and located at a side of the inlet press block facing away from a liquid feed port, wherein an elastic member is provided between the pre-tensioning part and the inlet press blocks to achieve sealing abutment among the cell core, the inlet press block and the outlet connection assembly.

2. The flow cell of claim 1, wherein the outlet connection assembly comprises a window pressed against the end of the cell core provided with the liquid discharge recess, wherein a light-shielding film is provided at a side of the window facing towards the liquid discharge recess, the light exit hole is provided on the light-shielding film, and a light through hole corresponding to the light exit hole is provided on the housing.

3. The flow cell of claim 2, wherein the outlet connection assembly further comprises a gasket surrounding the light through hole and sandwiched between the housing and the window.

4. The flow cell of claim 1, wherein the inlet connection assembly further comprises a return pipe penetrating through the cell core, and the return pipe has an end connected to the liquid discharge recess.

5. The flow cell of claim 1, wherein the outlet connection assembly further comprises:
   an outlet press block pressed against the end of the cell core provided with the liquid discharge recess;
   a liquid discharge tube penetrating through the outlet press block and in communication with the liquid discharge recess; and
   a light exiting tube penetrating through the outlet press block and in communication with the liquid discharge recess, wherein the light exit hole is formed on the light exiting tube.

6. The flow cell of claim 1, further comprising a protective sleeve, wherein the liquid-core waveguide is sleeved with the protective sleeve.

7. The flow cell of claim 2, wherein the window is quartz glass, and a diameter of the light exit hole is smaller than or equal to 0.5 mm.

8. The flow cell of claim 3, wherein the window is quartz glass, and a diameter of the light exit hole is smaller than or equal to 0.5 mm.

9. The flow cell of claim 2, wherein the light-shielding film is a metal film or a screen printing coating film.

10. The flow cell of claim 3, wherein the light-shielding film is a metal film or a screen printing coating film.

11. A liquid chromatographic unit, comprising the flow cell of claim 1.

12. The liquid chromatographic unit of claim 11, wherein the outlet connection assembly comprises a window pressed against the end of the cell core provided with the liquid discharge recess, wherein a light-shielding film is provided at a side of the window facing towards the liquid discharge recess, the light exit hole is provided on the light-shielding film, and a light through hole corresponding to the light exit hole is provided on the housing.

13. The liquid chromatographic unit of claim 12, wherein the outlet connection assembly further comprises a gasket surrounding the light through hole and sandwiched between the housing and the window.

14. The liquid chromatographic unit of claim 11, wherein the inlet connection assembly further comprises a return pipe penetrating through the cell core, and the return pipe has an end connected to the liquid discharge recess.

15. The liquid chromatographic unit of claim 11, wherein the outlet connection assembly further comprises:
   an outlet press block pressed against the end of the cell core provided with the liquid discharge recess;
   a liquid discharge tube penetrating through the outlet press block and in communication with the liquid discharge recess; and
   a light exiting tube penetrating through the outlet press block and in communication with the liquid discharge recess, wherein the light exit hole is formed on the light exiting tube.

16. The liquid chromatographic unit of claim 11, further comprising a protective sleeve, wherein the liquid-core waveguide is sleeved with the protective sleeve.

17. The liquid chromatographic unit of claim 12, wherein the window is quartz glass, and a diameter of the light exit hole is smaller than or equal to 0.5 mm.

18. The liquid chromatographic unit of claim 13, wherein the window is quartz glass, and a diameter of the light exit hole is smaller than or equal to 0.5 mm.

19. The liquid chromatographic unit of claim 12, wherein the light-shielding film is a metal film or a screen printing coating film.

20. The liquid chromatographic unit of claim 13, wherein the light-shielding film is a metal film or a screen printing coating film.

* * * * *